W. G. CHRISTOPHERSON.
MANUFACTURE OF VULCANIZED PLASTIC ARTICLES.
APPLICATION FILED SEPT. 7, 1916.
1,229,175.
Patented June 5, 1917.
2 SHEETS—SHEET 1.
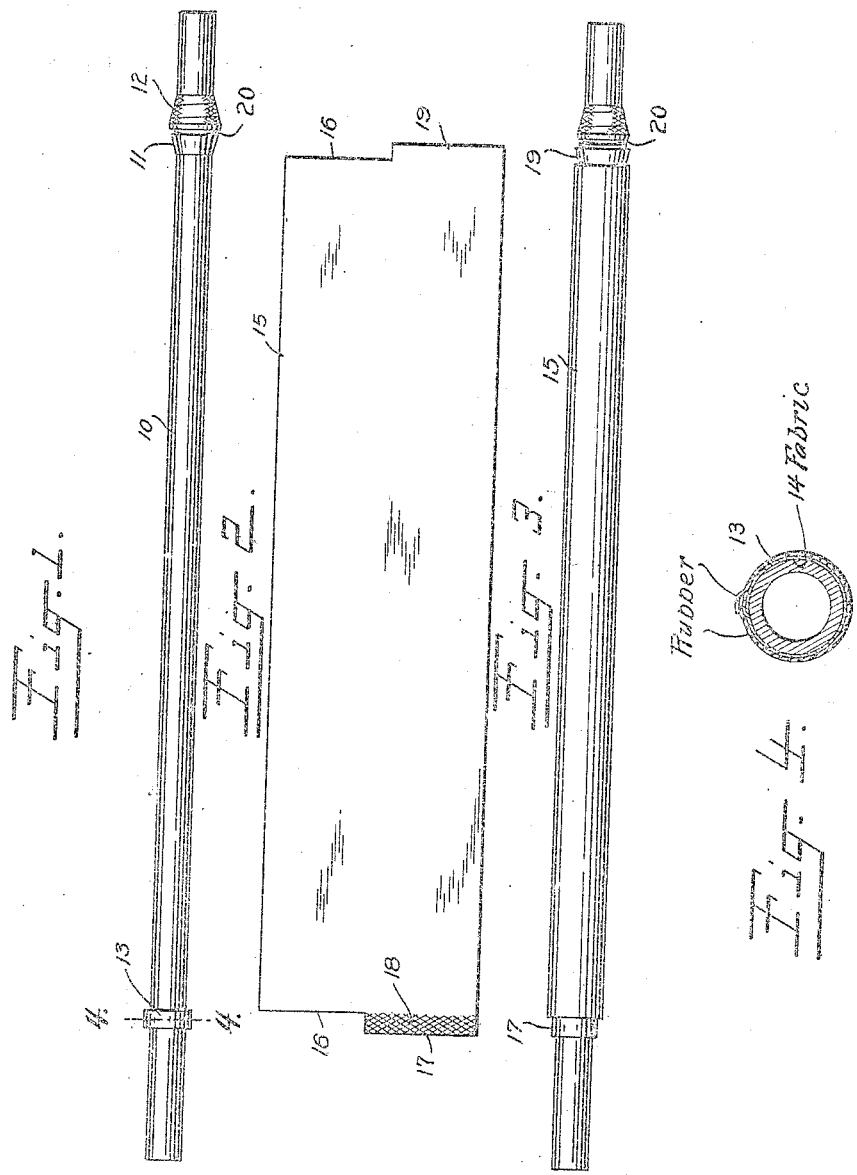
WITNESS:
INVENTOR
William G. Christopherson,
BY
HIS ATTORNEY

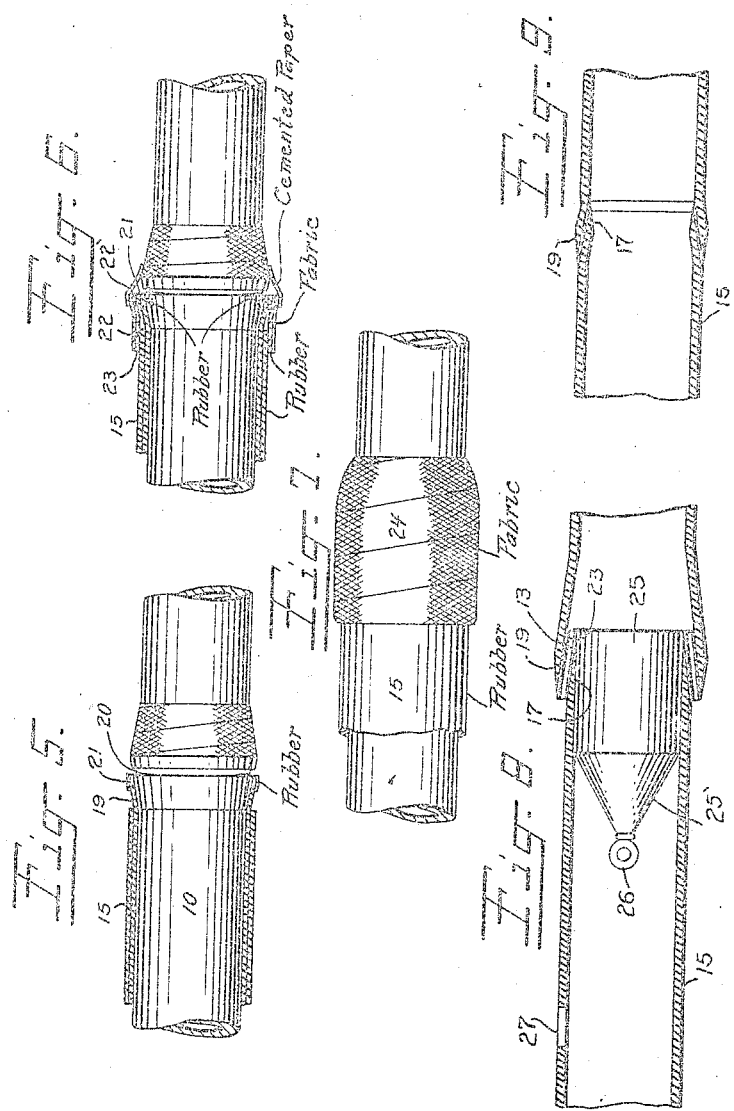

UNITED STATES PATENT OFFICE.

WILLIAM G. CHRISTOPHERSON, OF DETROIT, MICHIGAN, ASSIGNOR TO MORGAN & WRIGHT, A CORPORATION OF MICHIGAN.

MANUFACTURE OF VULCANIZED PLASTIC ARTICLES.

1,229,175.

Specification of Letters Patent.

Patented June 5, 1917.

Continuation of application Serial No. 2,588, filed January 16, 1915. This application filed September 7, 1916. Serial No. 118,792.

*To all whom it may concern:*

Be it known that I, WILLIAM G. CHRISTOPHERSON, a citizen of the United States, and a resident of Detroit, county of Wayne, and State of Michigan, have invented certain new and useful Improvements in the Manufacture of Vulcanized Plastic Articles, of which the following is a full, clear, and exact description.
This invention relates generally to the manufacture of homogeneous vulcanized plastic joints, and more particularly to the manufacture of such joints in connection with the manufacture of inner tubes, and I shall describe one embodiment of the invention particularly applicable to the manufacture of inner tubes. This application is a continuance of my prior application, filed January 16, 1915, Serial No. 2,588.
By my invention I obviate the use of cement for joining the ends of the tube, eliminate the usual second cure of the tube, and produce a strong joint of homogeneous vulcanized rubber in the product.
In the manufacture of inner tubes it is customary to cure the tube on a pole, strip the tube therefrom, join the ends with cement, and finally again cure the tube to produce a firm union of the material at the joint. As a result of this process, namely, twice curing the tube, the tube is weakened to withstand severe conditions of service.

By my invention I provide a process in which the tube is cured but once, and by which the union of the ends of the tube is effected by positioning therebetween rubber devoid of or with reduced vulcanizing compound, the joint being produced by treating said rubber with a vulcanizing agent, preferably with sulfur chlorid, and pressing the ends together, as will now be described.

The invention will be readily understood from the following description, taken in connection with the accompanying drawing, in which—
Figure 1 is a side elevation of the pole equipped with a strip of rubber in accordance with the first step of carrying out the process;
Fig. 2 is a plan view of the blank of rubber stock used to form the body of the tube;

Fig. 3 is a side elevation showing the blank applied to the pole, shown in Fig. 1;

Fig. 4 is a cross-sectional view on the line 4—4 Fig. 1; and

Figs. 5 to 9 inclusive are fragmentary views showing consecutive steps in the process of uniting the ends of the tube.

In carrying out the invention a pole 10 of the usual and well known type used in manufacturing inner tubes, is provided at one end with a tapered collar 11 which is preferably formed of hard rubber and is preferably permanently held in place by a wrapping of fabric 12.

A strip of film rubber 13, preferably Para .007 of an inch thick, carried on a strip of fabric 14, preferably cambric, is wrapped about the pole at the end opposite the collar, so that the rubber is on the outside, one end of the rubber being separated from the fabric and lapped on the outside of the opposite end, as shown in Fig. 4. This rubber is pure gum and carries no or very little sulfur or other vulcanizing compounds.

The sheet rubber stock 15 for the body of the tube, is then wrapped twice about the pole, the opposite ends of the sheet being cut away for one half the width of the sheet as shown at 16 so that when the sheet is wrapped about the pole a cuff of but one thickness of stock will exist on each end of the tube.

The cuff 17 adjacent to the rubber strip 13 is roughened on the inside as indicated at 18 so that it will adhere to said strip. The cuff 19 at the opposite end of the tube is roughened on the outside and is positioned so that it extends to within a quarter of an inch more or less from a guide groove 20 formed on the collar 11, as shown in Fig. 3. Of course, the sheet rubber stock 15 carries the necessary sulfur or other compounds for vulcanization.

Next a strip of rubber 21, preferably red rubber composition, about five-sixteenths of an inch wide, is wrapped about the collar even with the guide groove 20 and overlapping the end of the previously roughened cuff 19 about one-sixteenth of an inch more or less, as best shown in Fig. 5. This red rubber composition has no fabric attached to it. Next a strip of rubber similar to the strip 13 used on the other end of the pole, and likewise having no or very little sulfur or other vulcanizing compounds, is wrapped about the red rubber composition and overlaps the tube stock as best shown in Fig. 6, but in this instance the fabric 22 is disposed on the outside while the rubber 23 is disposed on the inside and adheres to the tube stock 15 and to the red rubber composition 21. About the edge of fabric 22 I then preferably apply a strip of soft cemented paper 22' about one-half inch in width which acts as an additional protection for the rubber strip 23 to prevent foreign matter reaching the same during the subsequent vulcanization. The whole is then wrapped with a strip of vulcanized rubber-friction bias-cut muslin or other fabric 24 coated with a non-vulcanizing cement, best shown in Fig. 7, whereby the rubber strip 23 is protected from the access of moisture during the cure. The whole tube is then wrapped in the usual way with fabric and placed in a vulcanizer and cured. During cure the strips 13, 21 and 23 of rubber will become united with the tube stock since the vulcanizing compounds in the latter must permeate the contact faces of the former sufficiently to effect the union of the materials, while the fabric covered faces of said strips of rubber will be uneffected and retain the normal adhesiveness of raw rubber.

After cure, the fabric wrapper is removed and the tube is stripped from the pole either manually or by the usual air pressure process, the tube being turned inside-out after or during the stripping operation. A cylindrical plug 25 is then inserted in one end of the tube, as best shown in Fig. 8, the plug having a conical end 25' equipped with a ring 26. The paper and fabric seals or protective strips are then removed from the rubber strips 13 and 23, on both ends of the tube, and the flared cuff 19 which was previously formed on the collar 11 is lapped over the small cuff 17, to bring said rubber strips into register, the exposed adhesive faces of said rubber strips having been treated prior to the overlapping operation with a cold vulcanizing compound such as sulfur chlorid. The cuffs are then pressed firmly together and after a few minutes vulcanization of the rubber strips is accomplished with resultant union of the ends of the tube.

The plug 25 is removed from the tube by first extending the latter with air pressure to loosen the plug, the plug then being urged manually along the tube until the ring 26 on the end projects through the hole 27 in the tube to be subsequently used for the valve. The ring is then placed over a hook or other stationary support and the tube given a quick jerk which pulls the plug bodily through the hole and completes the operation.

Having thus described my invention, what I claim and desire to protect by Letters Patent is:

1. The process of joining parts of an article composed of vulcanizable rubber, which comprises applying layers of substantially non-vulcanizable rubber to the surfaces of the parts to be joined, vulcanizing said parts, applying to said layers a vulcanizing agent, and then causing the same to contact with each other whereby they are vulcanized together by said agent.

2. The process of making annular tubes which comprises applying to the ends of a tube of vulcanizable rubber, layers of substantially non-vulcanizable rubber, vulcanizing said tube, applying to said layers a vulcanizing agent, and uniting said ends by causing said layers to contact with each other whereby they are vulcanized together by said agent.

3. The process of manufacturing inner tubes consisting of forming a rubber tube with one flared end, applying to the outside thereof and the inside of the opposite end layers of substantially non-vulcanizable rubber, vulcanizing said tube, turning the vulcanized tube inside out, treating said layers with sulfur chlorid, telescoping the smaller end of the tube into the flared end to bring the treated layers into register, and pressing said layers together.

4. The process of making inner tubes consisting of forming a vulcanizable rubber tube, applying to the inner and outer surfaces respectively of opposite ends thereof a strip of substantially non-vulcanizable rubber, supplying said strips on their exposed surfaces with a protective covering, vulcanizing the tube, stripping off said covering, turning said tube inside out, treating said strips with a vulcanizing agent, and pressing said treated strips together.

5. The process of making a lapped joint of two ends of rubber tubing which consists in forming the tubing of rubber compound vulcanizable by heat, surfacing the two ends about their margins interiorly and exteriorly respectively with rubber adapted for cold curing, subjecting the tubing to a heated vulcanizing medium while maintaining the said ends protected from direct contact with said medium, subjecting the surfaces adapted for cold curing to the cold cure treatment and finally bringing the surfaces into contact and maintaining the contacting surfaces under pressure during vulcanization.

Signed at Detroit, Mich., this 22nd day of August, 1916.

WILLIAM G. CHRISTOPHERSON.